United States Patent Office 3,140,724
Patented July 14, 1964

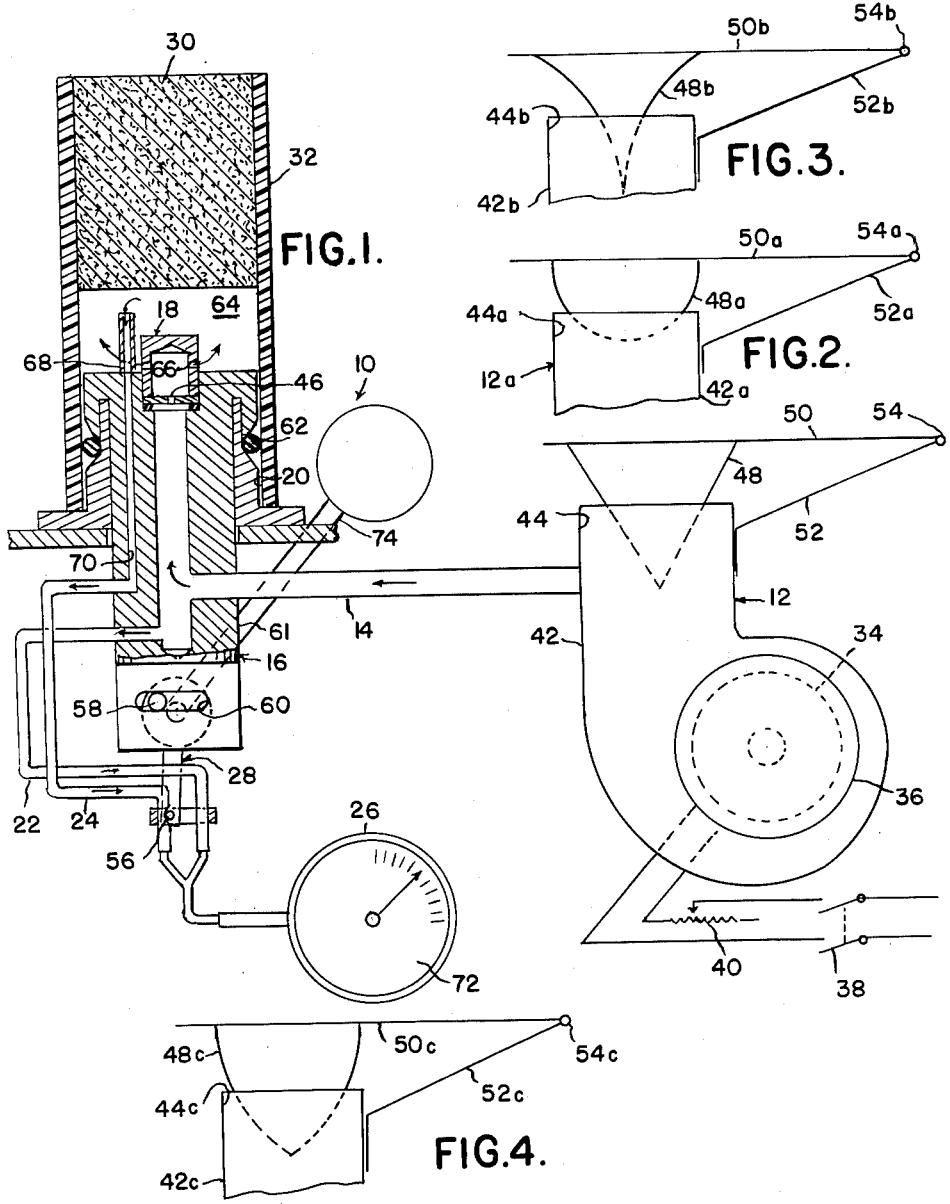
July 14, 1964 — H. W. DIETERT ETAL — 3,140,724
PIVOTED PRESSURE RELEASE VALVE FOR USE WITH A PERMEABILITY METER
Filed Nov. 7, 1960
INVENTORS
HARRY W. DIETERT
RALPH E. STEINMUELLER
RANDOLPH L. DIETERT
BY Whittemore
Halbert & Belknap ATTORNEYS

3,140,724
PIVOTED PRESSURE RELEASE VALVE FOR USE WITH A PERMEABILITY METER
Harry W. Dietert, Kerrville, Tex., and Ralph E. Steinmueller and Randolph L. Dietert, Detroit, Mich., assignors to Harry W. Dietert Co., a corporation of Michigan
Filed Nov. 7, 1960, Ser. No. 67,698
7 Claims. (Cl. 137—527.6)

The invention relates to permeability meters and refers more specifically to apparatus for determining the permeability of granular material including improved means for maintaining a constant pressure therein.

The necessity of maintaining a constant pressure in apparatus for determining the permeability of sand or similar granular material by the orifice method will be readily appreciated. In the past, complicated and often expensive apparatus has been provided to produce the constant pressure necessary. The constant pressure means has therefore increased the initial cost of prior permeability meters and added to the maintenance requirements thereof.

It is therefore one of the objects of the present invention to provide a permeability meter including simplified apparatus for maintaining a constant pressure therein.

Another object is to provide a permeability meter for determining the permeability of granular material by means of the orifice method including a high speed motor and blower for delivering air at a substantially constant pressure to the permeability meter through a duct, said duct having an opening therein closed by means of a pivotally mounted closure member of variable cross-sectional area, which closure is biased toward a closed position by a substantially constant force.

Another object is to provide pressure regulating apparatus for maintaining a constant pressure in a flowable medium comprising a duct having an opening therein, a motor and blower assembly connected to said duct for passing the flowable medium under pressure through said duct, and a guided closure for the top of said duct biased toward a closed position by a substantially constant force.

Another object is to provide pressure regulating apparatus as set forth above wherein the closure is pivotally mounted, is in the form of a cone with the apex extending into the opening in the duct, and has a base of substantially the same area as the opening in the duct.

Another object is to provide pressure regulating apparatus as set forth above wherein the sides of the conical closure are arcuate in longitudinal cross section.

Another object is to provide pressure regulating apparatus as set forth above wherein the closure is hemispherical.

Another object is to provide a permeability meter including improved pressure regulating apparatus which is simple in construction, economical to manufacture and efficient in operation.

Other objects and features of the invention will become apparent as the description proceeds, especially when taken in conjunction with the accompanying drawings, illustrating a preferred embodiment of the invention, wherein:

FIGURE 1 is a diagrammatic illustration of the permeability meter and improved pressure regulating apparatus of the invention.

FIGURES 2 through 4 are diagrammatic illustrations of modifications of the pressure regulating apparatus shown in FIGURE 1.

With particular reference to the figures, one embodiment of the invention will now be described.

The permeability meter 10 of the invention as shown in FIGURE 1 comprises the pressure regulating apparatus 12 operable to feed air through the conduit 14 under constant pressure to the body member 16 of the permeability meter. The permeability meter further includes the air metering means 18, O-ring post 20 and tubes 22 and 24 connecting the body member 16 to the pressure gage 26, as shown in FIGURE 1. Actuating means 28 are also provided to switch the pressure gage 26 between the tubes 22 and 24 and to seal the specimen tube 32 with the sample of granular material 30 therein to the O-ring post 20.

More specifically the pressure regulating apparatus 12 maintains the air pressure in conduit 14 and therefore at orifice 46 in the metering means 18. Pressure regulating means 12 comprises an electric motor 34 connected to the rotary blower 36 in the usual manner and electrically actuated through the control potentiometer 40 on closing of switch 38. The blower 36 is operable in the duct 42 to force air under pressure to open end 44 thereof and through the conduit 14 as previously indicated. The pressure regulating means 12 further includes the conical closure member 48 and supporting members 50 and 52 therefor connected by pivot means 54.

It will be noted that the base of the cone 48 is of substantially the same area as the open end 44 of the duct 42 whereby at very low air pressures within the duct 42 the end 44 thereof is closed by the closure 48 due to the weight thereof. As the pressure within the duct 42 is built up by means of the motor 34 and blower 36 to approach the desired pressure, such as for example ten centimeters of water, the closure 48 is pivoted about pivot means 54 so that the closure moves substantially vertically to maintain a projected area over the open end of the closure 44.

Thus the air pressure in the duct 42 and therefore in the conduit 14 will be regulated by the weight of the pivotally mounted closure 48 since if a pressure increase occurs after an equilibrium has been reached between the air pressure in the duct 42 and the weight of the closure 48, the closure will move upward about the pivot means 54 whereby more area is provided between the duct and closure to permit air to escape therebetween. If the air pressure drops in the conduit 42 the closure 48 will move downward about the pivot means 54 to lessen the area through which air may escape from the duct 42. A constant air pressure is thus effectively maintained in conduit 14 by means of the pressure regulating apparatus 12.

As is indicated above the regulated pressure of the means 12 will be controlled by the weight of the closure and may of course be varied by adding to or subtracting from the closure weight. In addition the closure 48 may take different forms, such as shown in the modifications 48a, 48b and 48c of FIGURES 2 through 4. The modified closure 48a shown in FIGURE 2 is hemispherical in form. The surface of the conical closures 48b and 48c, shown respectively in FIGURES 3 and 4, are respectively concave and convex. Each of these modifications of the closure 48 provides different pressure regulation for a given pivotal movement of the closure as will be understood by those in the art.

It will be noted that each of the modifications of the pressure regulating device 12 have in common a remote pivotal mounting about an opening in the top of an air duct from a pressure source and have a variable area axially of the air duct. Also the base of all the closure members is substantially equal to the area of the opening.

While such characteristics are deemed desirable it will be understood that modifications of the pressure regulating device 12 such as providing means other than the pivot mounting 54 to guide the closure 48 toward and away from the open end of the duct are contemplated. In addition other configurations for the closure 48 will readily suggest themselves to those skilled in the art. It is the intention to include all such modifications within the scope of the invention.

In over-all operation when it is desired to determine the permeability of the specimen of granular material 30 in specimen tube 32, the specimen tube 32 having the granular material 30 therein is placed over the O-ring post 20 with the actuating means 28 in the position shown in FIGURE 1. The motor and blower of pressure regulating means 12 are then activated to provide a constant air pressure at the orifice 46 in the manner just described. The handle 74 of the switching means 28 is then rotated in a counterclockwise direction to cause the flexbile tube 22 to be pinched closed by the pin 56 and the body member 16 to be cammed downwardly over the O-ring post 20 by means of the inner-action of the eccentrically mounted camming post 58 and the elongated circumferential slot 60 in the vertically movable body member 16 to seal between the camming post 20 and the specimen tube 32 on deforming the O-ring 62.

A predetermined quantity of air will flow through the exactly sized orifice 46 in the metering means 18 and into the chamber 64 through the radial orifices 66. A portion of the air in the chamber 64 will pass out through the sample 30 and a portion thereof will pass through the hollow pin 68 and passage 70 in the body member 16 through tube 24 which will now be open to the gage 26. The air pressure registered in the gage 26 may be indicated on the dial face 72 thereof directly in terms of permeability of a specimen of granular material of standard depth and compactness in the specimen tube 32, as will be understood by those in the art.

The accuracy of the permeability meter described above can be periodically checked by means of a standard specimen of known permeability by the procedure indicated above. In addition, on rotating the lever 74 clockwise to close the tube 24 and permit the flexible tube 22 to open, the operation and accuracy of the air pressure regulating means 12 may be checked.

Thus, it is seen that in accordance with the invention there is provided a simple efficient permeability meter including improved pressure regulating means, which pressure regulating means is ruggedly constructed so that it may be used under an adverse condition, such as is found in foundries, and which pressure regulating means combines economy of manufacture and accuracy of operation.

The drawings and the foregoing specification constitute a description of the improved permeability meter in such full, clear, concise and exact terms as to enable any person skilled in the art to practice the invention, the scope of which is indicated by the appended claims.

What we claim as our invention is:

1. A source of constant pressure air comprising an air duct having an opening therein, a conduit connected to said duct through which air is drawn from the duct at the constant pressure, a blower positioned within the duct operable to blow air into the duct in excess of the quantity of air required to maintain the constant pressure in the duct and means for controlling the area of the opening in the duct in accordance with the air blown into said one end of the duct and the air withdrawn through said conduit whereby the air escaping from the duct through the opening is equal to the air blown into said duct by the blower in excess of the air withdrawn therefrom through the conduit and that required to maintain the constant pressure in the duct including a bracket secured to said duct adjacent said opening, a lever pivotally secured at one end to said bracket and a closure member secured to the other end of said lever and urged only by gravity into a closed position with respect to said opening, said closure member including a base having a cross section larger than said opening, an apex within said duct and surfaces converging from the base toward the apex.

2. Structure as set forth in claim 1 wherein the dimension between the pivotal mounting of the lever and the closure is greater than the dimension of the closure base in the same direction.

3. A source of constant pressure air comprising a vertically extending air duct, the upper end of which is open, a conduit connected to said duct adjacent the upper end thereof through which air is drawn from the duct at the constant pressure, a blower connected to the duct at the lower end thereof operable to blow air into the duct in excess of the quantity of air required to maintain the constant pressure in the duct and closure means for variably closing the upper end of the duct to vary the open area of the open upper end of the duct in accordance with the air blown into the duct and the air withdrawn through the conduit to maintain the air escaping from the duct through the open end thereof equal to the air blown into the duct in excess of the air withdrawn therefrom through the conduit and that required to maintain the constant pressure in the duct, including a bracket secured to the duct adjacent the upper end end thereof and extending outwardly of the duct and upwardly beyond the upper end thereof, a substantially straight lever pivotlly secured at one end to the upper end of said bracket and a closure member secured to the other end of said lever and urged only by gravity into a closing relation with respect to the upper end of the duct, including a base having a cross-section larger than said opening, an apex within said duct and surfaces converging from the base toward the apex, the dimension of the lever between the pivot mounting thereof and the base of the closure member being greater than the corresponding dimension of said base so that the duct, bracket lever and closure are constructed and arranged with the lever horizontal for withdrawing the closure member from the end of the duct sufficiently to provide approximately the constant pressure required with the closure positioned symmetrically with respect to the open end of the duct.

4. Structure as set forth in claim 3 wherein the closure member is conical.

5. Structure as set forth in claim 3 wherein the closure member is hemispherical.

6. Structure as set forth in claim 3 wherein the surfaces of the closure member are convex.

7. Structure as set forth in claim 3 wherein the surfaces of the closure member are concave.

References Cited in the file of this patent

UNITED STATES PATENTS

| | | |
|---|---|---|
| 908,961 | Crabtree | Jan. 5, 1909 |
| 974,245 | Donnelly | Nov. 1, 1910 |
| 992,954 | Gamon | May 23, 1911 |
| 2,001,901 | Cunningham | May 21, 1935 |
| 2,159,484 | Levy | May 23, 1939 |
| 2,465,818 | Richardson | Mar. 29, 1949 |
| 2,694,358 | Taylor | Nov. 16, 1954 |
| 2,737,879 | Cooke | Mar. 13, 1956 |
| 2,985,186 | Mennesson | May 23, 1961 |
| 3,047,005 | Karr | July 31, 1962 |

FOREIGN PATENTS

| | | |
|---|---|---|
| 827,495 | Germany | Jan. 10, 1952 |